United States Patent Office 2,988,565
Patented June 13, 1961

2,988,565
O-ETHYL-O-ETHYLMERCAPTOETHYL CHLORO-METHYLTHIONOPHOSPHONATE
Arthur Dock Fon Toy, Park Forest, Ill., assignor to Victor Chemical Works, Chicago, Ill., a corporation of Illinois
No Drawing. Filed Nov. 14, 1958, Ser. No. 773,826
1 Claim. (Cl. 260—461)

This invention relates to O-ethyl, O-ethylmercapto-ethyl chloromethylthionophosphonate which has the formula

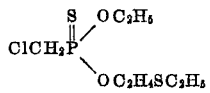

This compound has been found to be a valuable pesticide.

O-ethyl, O-ethylmercaptoethyl chloromethylthionophosphonate may be made according to the following equations:

(1)

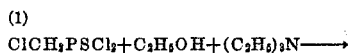

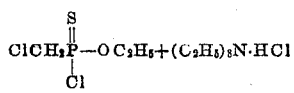

(2)

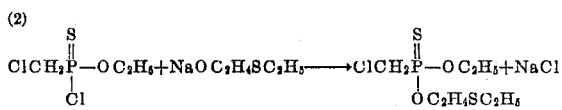

The chloromethylphosphonothioic dichloride reactant shown in above Equation 1 may be made according to the process described and claimed in copending Rattenbury application Serial No. 658,972, filed May 14, 1957, and in accordance with Examples I and II, infra. The other reactants may be the ordinary commercial grades of materials which are readily available.

Examples I and II, infra, illustrate methods of producing the chloromethylphosphonothioic dichloride reactant.

EXAMPLE I 2508.0 gms. of $ClCH_2POCl_2$ (15.0 moles) and 666.0 gms. of $P_2S_5$ (3.0 moles) were placed in a distilling flask equipped with a reflux condenser. The mixture was then heated at a reflux temperature of 185° to 180° C. for three hours. It was weighed and found to have lost 33.0 gms. The flask was then evacuated to an absolute pressure of 10 mm. of mercury and heated to a liquid temperature of 160° C., at which the vapor temperature was 88° C. The resulting distillate weighed 2049.4 gms. and was redistilled at a pressure of 30 mm. of mercury. The chloromethylphosphonothioc dichloride was collected over a vapor temperature range of 88°–89° C. It weighed 1589.3 gms. and analyzed as follows: $n_{25}D=1.5711$.

|  | Percent P | Percent Cl | Percent S |
| --- | --- | --- | --- |
| Analysis | 17.3 | 58.0 | 17.1 |
| Theory | 16.9 | 58.0 | 17.4 |

EXAMPLE II 83.8 gms. (0.5 mole) of $ClCH_2POCl_2$ and 169.5 gms. (0.5 mole plus 100% excess) of $PSCl_3$ were placed in a one liter glass liner. The liner was then placed in a small autoclave and placed under 300 p.s.i. nitrogen pressure. It was heated at 220° C.±10° for 5½ hours. It was then cooled, placed in a distilling flask and the excess $PSCl_3$ and $POCl_3$ removed at atmospheric pressure. The remaining product was cooled to 15° C., stirred with 18 cc. of water, separated, and dried. It was then placed in a distilling flask, evacuated to an absolute pressure of 30 mm. of mercury and distilled. The chloromethylphosphonothioic dichloride fraction distilling at a vapor temperature from 90° to 92° C. was collected and analyzed as follows: $n_{25}D=1.5742$.

|  | Percent P | Percent Cl | Percent S |
| --- | --- | --- | --- |
| Analysis | 16.8 | 58.0 | 16.9 |
| Theory | 16.9 | 58.0 | 17.4 |

Example III, infra, illustrates the preparation of O-ethyl, O-ethylmercaptoethyl chloromethylthionophosphonate.

EXAMPLE III

O-ethyl chloromethylthionophosphonic chloride was prepared by first placing 300 cc. of benzene and 183.5 gms. (1.0 mole) of $ClCH_2PSCl_2$ into a three-neck flask equipped with agitator, thermometer, reflux condenser and water bath. A mixture of 104.3 gms. of triethylamine and 47 gms. of 2B ethanol were then added dropwise into the flask with stirring at 25–30° C. over a period of 50 minutes. The slurry was then stirred an additional 2 hours at room temperature. The resulting liquid product was then filtered and distilled. The four best fractions representing 37.7% yield and having indices of refraction $n_{25}D=1.5162$ to 1.5193 were used in the hereinafter described procedure.

300 cc. of benzene, 42.6 gms. of ethylmercaptoethanol and 9.2 gms. of sodium were placed into a similarly equipped three-necked flask. The mixture was held at reflux temperature for 4 hours, after which the liquid was decanted from the small amount of unreacted sodium. This liquid was placed in another three-necked flask and 70.1 gms. of the previously prepared O-ethyl chloromethylthionophosphonic chloride was then added dropwise at 25 to 30° C. over a period of 35 minutes. The reaction mixture was stirred an additional hour at room temperature, after which the liquid organic layer was washed successively with two 300 cc. portions of water, 300 cc. of 1 N NaOH and three 300 cc. portions of water. Volatiles were then removed by heating at 40° C. while the pressure was slowly reduced to one mm. of mercury and held at this pressure for one hour. The resulting O-ethyl, O-ethylmercaptoethyl chloromethylthionophosphonate weighed 83.0 gms. (87% yield). It analyzed as follows:

|  | Percent P | Percent S | Percent Cl |
| --- | --- | --- | --- |
| Analysis | 12.2 | 23.9 | 15.7 |
| Theory | 11.8 | 24.4 | 13.5 |

This final compound was tested as a pesticide by spraying acetone solutions or acetone-water dispersions of the test compound on several species of insects as indicated in the following table and determining the lowest concentration that effected a 90–100% kill in a 24 hour period.

TABLE

| Insect | Effective Concentration,[1] percent |
|---|---|
| House Fly | 0.04 |
| German Roach | 0.1 |
| Confused Flour Beetle | >0.5 |
| Black Carpet Beetle | 0.5 |
| Granary Weevil | >0.1 |
| Bean Aphid | 0.001 |
| Two Spotted Mite | 0.005 |

[1] The lowest concentration that effects a 90-100% kill in a 24 hour period.

The above table shows that the product was particularly effective as an aphicide or miticide.

The foregoing detailed description has been given for clearness of understanding only, and no unnecessary limitations should be understood therefrom, as modifications will be obvious to those skilled in the art.

I claim:

The product

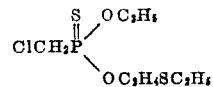

References Cited in the file of this patent

Razumov et al.: "Khim. i Primenenie Fosfororgan." Soedinenii, Akad. Nauk S.S.S.R., Trudy I-Oi Konferents. 1955 pp. 205–17 (Pub. 1957) (Abstracted in Chem. Abstracts, vol. 52, col. 294 (f)–(g) (Jan. 10, 1958).)